(12) United States Patent
Hubinak (10) Patent No.: US 10,741,902 B2
(45) Date of Patent: Aug. 11, 2020

(54) ANTENNA WITH CORE, MAINLY MINIATURE RFID AND/OR NFC ANTENNA, AND METHOD OF ITS PRODUCTION

(71) Applicant: LOGOMOTION, S.R.O., Piestany (SK)

(72) Inventor: Emil Hubinak, Piestany (SK)

(73) Assignee: Logomotion, S.R.O., Piestany (SK)

( * ) Notice: Subject to any disclaimer, the term of this patent is extended or adjusted under 35 U.S.C. 154(b) by 0 days.

(21) Appl. No.: 16/334,205

(22) PCT Filed: Sep. 18, 2017

(86) PCT No.: PCT/IB2017/055634
§ 371 (c)(1),
(2) Date: Mar. 18, 2019

(87) PCT Pub. No.: WO2018/051302
PCT Pub. Date: Mar. 22, 2018

(65) Prior Publication Data
US 2019/0229396 A1   Jul. 25, 2019

(30) Foreign Application Priority Data
Sep. 19, 2016 (SK) .................... 50056-2016

(51) Int. Cl.
*G06K 19/06* (2006.01)
*H01Q 1/22* (2006.01)
(Continued)

(52) U.S. Cl.
CPC ..... *H01Q 1/2225* (2013.01); *G06K 19/07749* (2013.01); *G06K 19/07773* (2013.01); *H01Q 1/38* (2013.01); *H01Q 7/06* (2013.01)

(58) Field of Classification Search
CPC ............ G06K 19/07749; G07F 7/1008; G06Q 20/341
(Continued)

(56) References Cited

U.S. PATENT DOCUMENTS 5,191,699 A    3/1993   Ganslmeier
5,396,698 A *  3/1995   Orthmann ................ H01Q 7/06
                                                              29/600

(Continued)

FOREIGN PATENT DOCUMENTS

EP          1983467         10/2008
WO     WO2013098784          7/2013
(Continued)

*Primary Examiner* — Ahshik Kim
(74) *Attorney, Agent, or Firm* — Defillo & Associates, Inc.; Evelyn A Defillo (57) ABSTRACT

Part of the conductive loop of the threads is formed by a printed circuit on the substrate (5), where the group of the conductive strips (2) placed side by side is produced, and the core (1) is placed on them. The conductive strips (2) overhang from the groundplan of the core (1) and the ends of the conductive strips (2) overhanging on both sides of the core (1) form the connecting surfaces (4). The wires (3) shaped for the encirclement of the core (1) are connected to the connecting surfaces (4), whereby the wire (3) connects a connecting surface (4) of one conductive strip (2) with the connecting surface (4) on the opposite end of the neighboring conductive strip (2). After bonding to one end of the conductive strip (2) the wire is shaped above the substrate (5) by bending in such a way that it arches over the space intended for the core (1) and all wires (3) are shaped in such a way that they produce a channel for the core (1) placed on the substrate (5). The conductive strips (2) are sloped from the normal of the core (1) under an angle pursuant to the pitch of the thread and the wires (3) are led in the opposite slope under the same angle.

20 Claims, 11 Drawing Sheets

(51) Int. Cl.
*H01Q 1/38* (2006.01)
*H01Q 7/06* (2006.01)
*G06K 19/077* (2006.01)

(58) Field of Classification Search
USPC .......................................................... 235/492
See application file for complete search history.

(56) References Cited

U.S. PATENT DOCUMENTS

| | | | |
|---|---|---|---|
| 6,930,646 B2* | 8/2005 | Yahata | G06K 19/07749 343/718 |
| 7,167,140 B2* | 1/2007 | Kato | H01Q 1/273 343/788 |
| 7,694,886 B2* | 4/2010 | Tan | G06K 19/07749 235/487 |
| 7,812,777 B2* | 10/2010 | Yosui | H01Q 1/2225 343/702 |
| 8,514,083 B2* | 8/2013 | Mani | G06K 19/07749 174/250 |
| 2004/0056816 A1 | 3/2004 | Bittar | |
| 2005/0179552 A1 | 8/2005 | Shoji | |

FOREIGN PATENT DOCUMENTS

| | | |
|---|---|---|
| WO | WO2014076669 | 5/2014 |
| WO | WO2016071885 | 5/2016 |

* cited by examiner

ANTENNA WITH CORE, MAINLY MINIATURE RFID AND/OR NFC ANTENNA, AND METHOD OF ITS PRODUCTION

CROSS REFERENCE TO RELATED APPLICATION

This application is a national stage entry of PCT/IB2017/055634 filed Sep. 18, 2017, under the International Convention and claiming priority over Slovak application PP 50056-2016 filed Sep. 19, 2016.

FIELD OF TECHNOLOGY

The invention concerns thin antenna with a core with small dimensions which is suitable mainly for deposition to the cased carriers such as removable memory cards, SIM cards, mobile communication devices and so on. The antenna achieves excellent emitting characteristics even from the shaded placement and it is suitable for RFID and/or NFC applications. The invention also discloses highly productive method of production of the antenna with the core.

PRIOR ART

Mainly flat antennas in shape of conductive loops are used for NFC/RFID, whereby in situation of small dimensions of the carrier for placement of the conductor whole available surface is used. Basic theoretical and academic publications hold a position that in case of small thickness and small available surface the RFID or NFC antenna should be produced as flat antenna, for example according to RFID HANDBOOK, Klaus Finkenzeller, 2010, drawings 0.11, 2.15, 12.7, 12.9, 12.11, 12.13.

According to similar source (part 4.1.1.2 Optimal Antenna Diameter/Physical Principles of RFID Systems) it is most optimal if the diameter of the transmitting antenna corresponds to the square root of the required reach of the antenna. After the placement of the NFC antenna on the relatively small surfaces the antenna has a form of the inscribed spiral rectangular winding with rounded edges, which basically copies the outer shape of the available surface. This arrangement has produced relatively typical shape of the flat NFC/RFID antennas.

During further diminishing of the antennas it has been proved as suitable to use NFC/RFID antenna with ferrite core according to earlier published applications by Logomotion/SMK WO/2013/098784, WO/2014/076669, WO/2016/071885. During the production of these antennas the problem lies in effective and fast winding of the conductors on the core in such a way that it achieves desired slope of the winding with a very fine conductor, or with thin flat conductor, respectively, which is prone to snapping in places of deformation. The disadvantage during the typical production of the antenna with winding of the conductor is the low mechanical resilience of the conductive loops during further mounting of the antenna into circuits. PCB substrates with the circuits are often closed into casings, whereby the antenna can be exposed to mechanical pressure or increased heat. The solidity of the wound conductor can be increased by increasing its thickness, which with required small dimensions of the antenna is impossible, and which would also worsen the emitting characteristics of the antenna.

Such solution of the antenna with the core is therefore desired which would solve these deficiencies and which would also allow further diminishing of the dimensions of the antenna while maintaining good emitting characteristics for the signal. The antenna should be suitable for placing on the PCB of an electronic device, on SIM card of any size, or on removable memory card or directly on the chip.

SUMMARY OF THE INVENTION

The abovementioned deficiencies are significantly remedied by an antenna with a core, mainly miniature RFID and/or NFC antenna, where the conductive loops encircle the oblong core placed on the non-conductive substrate, where part of the conductive loop is formed by a printed circuit on the substrate according to this invention, which essence lies in the fact that a group of adjacently placed conductive strips on which the core is placed is formed on the substrate, the conductive strips overreach through the ground plan of the core in such a way that the ends of the conductive strips overreaching on the sides of the core form connecting surfaces (or connecting little surfaces, or connecting pads); wires shaped for encirclement of the core are connected to the connecting surfaces, whereby the wire connects the connecting surface of one conductive strip with the connecting surface on the opposite end of the neighboring conductive strip. The conductive strip and the wire from the conductors of individual loops; loops encircle the core of the antenna.

The conductive loop is formed by a printed circuit on a substrate and shaped wire which connects the printed circuit with the opposite end of the neighboring printed circuit. Such conductive loops are huts formed by two different conductive elements.

Such arrangement allows simply solving of the technical problems common during typical winding of the solid conductor around the core. First conductive element of the loop has flat character, since it is formed by a conductive strip formed on the substrate and it is produced by a common method, such as the applied conductive paths on the PCB. During constant pitch of the thread the conductive strips on the substrate are parallel and have similar size and shape. This will usually hold with exception of first and last conductive strip; these can have a shape suitable for connection of an antenna to the circuit. If the antenna has multiple branches (digressions), the conductive strips with the produced outlets will differ compared to neighboring conductive strips. This is another advantage of the antenna according to this invention: it can be freely designed as antenna with various digressions, which are easily produced as part of conductive strips. Conductive strips can be produced directly on the PCB; in such case the antenna is produced as part of the board with other circuits. In another case the conductive strips can be produced on a surface of the chip or on the independent surface, for example a pad with the dimensions pursuant to the ground plan of the whole group of the conductive strips, whereby such pad forms a basis of the antenna as an independent component. According to this the antenna can be produced as independent component, as part of the electronic or electric component or as a part of the PCB of the host device. Conductive strips can be easily and quickly produced by contemporary technologies in such a way that they have a necessary width and form flat conductor of a single part of the loop. With the constant pitch of the thread the non-conductive gaps between the conductive strips will be usually smaller than the half of the width of the conductive strip, preferably smaller than a quarter of the width of the conductive strip. Small gaps between the neighboring conductive strips prevent the magnetic field from leaking outside the ends of the core.

The second conductive element is a shaped wire which allows encirclement of the core of the antenna. The adjective "shaped" denotes such shape of the wire that the connection of the conductive strips into loops above the core is achieved. The core can be embedded in the thickness of the substrate. When it is, a groove is produced in the substrate for embedding of the core. The core according to this invention is usually flat, so it can be all embedded in the substrate. In such case the conductive strip on the substrate runs through the groove, and runs on both sides upward towards the plane of the upper edge of the core, where there is the conductive strip ended on both sides by connecting surfaces. In such embedded arrangement it is possible to connect the connecting surfaces on both sides of the core by directly led, not folded wire. Such shaping of the wire therefore ensures, pursuant to the position of the core, connection of the connecting surfaces and even direct leading of the wire is considered shaping for the purposes of this text.

Shaped wire will be preferably produced and attached to connecting surfaces by wire bonding. "Wire bonding" means production of the solid connection of the wire to the connecting surface, usually it concerns welding of the wire from the metal or metal alloy, respectively. Suitable metals are gold, aluminum, copper, silver and their alloys, for example AlSi. Usually the choice of the material takes into account not only electric characteristics and material of the conductive strips or a material of the connecting surfaces, respectively, but also strength of the material so that the shaping of the wire during bonding is possible. During the welding a thermocompression, ultrasound or thermosonic welding can be used. This produces long-term reliable joint without technical noise. The bonding allows for highly productive method of production, whereby the core is mechanically anchored to the substrate by conductive strips. The necessary U shape of the wire is shaped directly by the movement of the bonding needle which welds or solders the ends of the wire to the connecting surfaces.

Bonding is known during connection of the components with high density of the outlets. Usually the wires with the diameter smaller than 100 μm are used; the thinnest wires have a diameter 15 μm. The wires for bonding are not isolated and the isolation of neighboring wires is ensured by a gap between them, which size is in order of tens of μm. The sizes of the antenna in this invention are significantly larger, though, usually in order of millimeters. With the antenna of the length of the core ca. 9 mm the width of the conductive strip is more than 0.25 mm. With such dimensions the bonding does not appear at the first glance as suitable technology, but during the inventing there appear multiple advantages of precisely this method.

In the preferable arrangement the conductive strips are sloped towards the axis of the antenna with the angle pursuant to the pitch of the threads, whereby the bonded wires are in ground plan view led in opposite slope with the same size of the angle. This achieves similar course of the conductive loop as in case of typical winding of the wire on the core. The pitch of a single thread on the core can be divided between conductive surface and the wire unevenly, where the thread ensures only one, or usually only one, of the mentioned parts of a single conductive loop. It is preferable if the conductive strips are sloped from the normal of the core, that is, if they are diverted from the line perpendicular on the longitudinal axis of the core. It is simple to achieve suitably shaped and sloped image of the conductive strip on the substrate. The wires can be led with the diversion from the normal or in parallel with the normal. Not sloped course of the wires is advantageous mainly in case of flat cross-sections of the wire.

The core is usually oblong, mainly of rectangular, trapezoidal or combined cross-section, where the width of the cross-section of the core is at least 3 times the height of the cross-section of the core and the length of the core is at least 10 times the height of the cross-section of the core. The height of the cross-section of the core does not surpass 1 mm; often it is smaller than 0.5 mm. With these cores the mechanical solidity, desired for the manipulation and winding of the conductors according to common method, is problematic, too. This is solved by the antenna and the method of its production according to this invention, since the core is not stressed during the production; it is stressed neither by rotation, nor by movement, nor by gluing. The longitudinal edges of the core can be skewed or shaped in such a way that they follow the shape of the wire which is achievable with use of a particular technology. The slope or shape of the edges can be achieved during the cutting of the core from the semi-finished product, where the cutting disc has an edge polished into the respective cross-section.

The conductive windings around the core are produced from a combination of individual conductive strips and wires; the wire is not wholly wound around the core, which prevents the problems stemming from its mechanical stress during the classical winding on the core, which is especially problematic with a very fine wires, that is, wires thinner than 0.25 mm. The mechanical pressure on the core is with the antenna according to this invention transferred to the substrate without the snapping of the windings.

It proved preferable if the conductive loops overhang through the side on both sides of the core in the length of at least 5% of the crosswise dimension of the core, in length at least 0.5 mm in minimum. Such connecting surfaces create the wings on the sides of the core. On the connecting surfaces the whirling currents appear due to the alternating magnetic field from the core. The whirling currents generate back the magnetic field and such secondary magnetic field creates a magnetic shield, magnetic cover, which prevents the leaking of the magnetic field to the environment. The series of the connecting surfaces placed side by side creates a magnetic shielding pipe, which orientates the magnetic field on the inside to the ends of the core and prevents the leaking on the sides. This synergetic effect brings about the improvement of the transmitting features of the antenna, which allows its further miniaturization.

Significant advantage of this invention is the ability to achieve various dimensional, geometric and material arrangements and also various electric parameters of the antenna on a small available surface, whereby the antenna has high mechanical resilience and good transmitting features.

From the point of view of a good transfer of the mechanical load and in order to support the creation of a magnetic shield on the connecting surfaces, a solution proved advantageous where the wire is in the joint on the connecting surface folded in such a way that its end directs in parallel with the plane of the conductive strips on the substrate and it is oriented in the direction out of the core or, eventually, it deviates from the plane with the conductive strips in the 30° degree. The wire from the connecting surface subsequently ascends in line of an arc by the side of the core up towards the core. In another arc the wire is shaped into the horizontal part above the core. Both arcs of the wire by the connecting surfaces of the antenna ensure the mechanical flexibility of each conductive loop, and allow reversible deformation during the heat changes or during the mechanical stress. The eventual punctual mechanical or heat load or otherwise uneven pressure or heat load of the antenna during its mounting and casing is not transferred or cumulated on the neighboring conductive loops.

The disclosed course of the wire during the joint on the connecting surface can be achieved mainly by wedge bonding. During the wedge bonding a wedge-like course of the wire is achieved, whereby a fold is produced behind it. The fold in the vicinity of the contact of the core with the substrate ensures the flexibility of the loop. This allows it not only to bear well the mechanical load of the antenna but also other eventual mechanical shaping of the wires for example by means of pressing tool which achieves the final shape of the wires.

With such use of the wedge bonding it is possible to produce a double folding of the wire on the connecting surface. In such arrangement the wire has folds in the shape of the letter "S". Subsequent pressing by means of an abovementioned pressing tool presses this stock of the wire into the flat shape.

The wire can have a circular or flat or oval cross-section, or a cross-section resulting form the combination of the mentioned basic shapes. In case of the circular cross-section multiple wires can be used for a single loop, whereby the wires connect identical connecting surfaces, that is, one connecting surfaces of the conductive strip is connected with the identical surface on the opposite end of the neighboring conductive strip. Minimal width of such conductor of the loop with multiple wires will be defined mainly by the dimensions of the bonding head which should run without interferences alongside the core, the already bonded wires and so on. During multiple leading of the wires within a single loop the minimal distance between the non-isolated wires does not have to be maintained; these wires can touch each other within a single loop. The limitations on the number of wires per loop will follow mainly from the maximal density of the bonding on a single connecting surface which can be achieved by a particular bonding technology.

Especially preferable is a use of the flat wire which width is within 50% to 100% of the width of the conductive strip, and which has a width surpassing the double of its thickness, where good transmitting features of the antenna are achieved. A single piece of a flat wire is folded during the bonding at four places, whereby the folds are led around the axis with the smallest quadratic moment of the cross-section. The quadratic moment of the cross-section at full flat profile is $J_x=bh^3/12$, where b is a width of the profile and h is a height of the profile. The resistance of the flat wire against bending is therefore significantly smaller in the axis which is parallel with the longer side of its cross-section. For example, in case of a wire with width 2× and with thickness x the resistance against bending and related deformation forces differ fourfold pursuant to the orientation of the fold. The flat wire is folded by the upper edge of the core in such a way that downwards—towards the connecting surface—it heads askew pursuant to the angle in which it clenches the wire on the upper surface of the core against the axis of the antenna. That means that the flat wire is not deformed into completely vertical direction by the lateral wall of the core.

It is preferable if the flat wire is used that the pitch of the thread of each loop is ensured only by the slope of the conductive strip and the flat conductors are led perpendicularly on the longitudinal axis of the core. In such case it is possible to achieve a fold identical with the line of the edge of the core by means of the existing bonding technique. If an askew led flat wire is used, and common bonding technique is used, the gaps from the core will be produced on the folds of the flat conductor, which is displayed in detail on FIG. 10; in particular application this is not necessarily a problem. If the bending of the wire achieves a mutual tilt of the bonding head and the substrate, the fold of the flat wire can be identical with the line of the edge of the core even with a wire led askew. In case the core is entirely embedded in the substrate, the flat wires can be led askew without folds.

The deficiencies in the prior state of the art are significantly remedied by a method of the production of the antenna with the core, too, mainly a miniature RFID and/or NFC antenna, according to this invention which essence lies in the fact that on the non-conductive substrate a group of independent conductive strips placed side by side is created; the number of the conductive strips corresponds to the number of the conductive loops of the antenna, whereby the end of one conductive strip is welded by bonding to the first end of the wire. The wire is the subsequently shaped in such a way that the space for the core of the antenna is arched over; the second end is welded to the opposite end of the neighboring conductive strip. Usually the separation of the wire from its supply from the stock roll—that is, creation of the second end of the wire—is realized only during the welding or after the welding on the opposite end of the neighboring conductive strip. Subsequently the welding of the wires for all conductive loops of the antenna is repeated, which connects all conductive strips behind each other. Originally independent, conductive strips not conductively connected on the substrate, become a part of the thread loops placed on the surface of the substrate and the wires connect conductive strips gradually behind each other, whereby the wires are shaped in such a way that they produce a tunnel, a channel for the core.

Multiple wires can be bonded in a single step in order to improve the speed of the production of the antenna; preferably all wires on a single lateral side of the core are bonded. It is then preferably if a bonding multi-head—which in a single step connects the line of all wires on one lateral side of the core and in the second step on the other lateral side of the core—is used. In order to lead the wires reliably while doing so, the foil in which the wires are placed—glued in the desired pitch and slope—is used. The foil can be temporary, or it can be permanently left as a mechanical protection of the wires. The foil can be preferably used for a case where the core is produced from the partially plastic matter which is pressed into the cavity between the wires and conductive strips. The ferrite paste with a suitable viscosity before its ossification is at such approach pressed into the cavity where it ossifies and produces a solid body of the core.

The core can be placed on the substrate before the bonding of the wires or after the bonding of the wires. In the first case the core is placed on the conductive strips in the correct orientation—that is, transverse through the conductive strips; after subsequent bonding the wires encircle the core, the core is as if sewed to substrate. The upper edges of the core can form a tool during the shaping of the wire. In the second approach the wires are shaped by the movement of the bonding needle in such a way that the shaped of "U" with the cannel for subsequent insertion of the core is achieved. The core is inserted into the channel after all or most of the wires are bonded. Such approach creates a possibility of a tighter leading of the wire alongside the lateral walls of the core; the bonding needle is not limited by the body of the core. Before it is placed into the channel, the core can be cooled so that after it is placed on the substrate and then heated in grows and leans onto the wires, which ensures its reliable connection. In another arrangement the core can be stuck to the substrate or the core can be inserted into the channel from the bonded wires, whereby at least one last wire is bonded after the insertion of the core, and that wire forms tight encirclement.

The combination of the flat connection and the bonded wire allows one to achieve varying pitch of the thread; it allows to use a core with the varying cross-section, too, for example such a core which follows the available surface on the PCB; last but not least, it allows to produce a core with varying shape, for example a folded, bent core.

The example of the dimension of the antenna which is capable of transmitting from the shielded slot of the SIM card in the telephone follows:

| Size | Total thickness | Ferrite core | Air gap | Width | Length |
|---|---|---|---|---|---|
| Mini/Micro SIM | 440 μm | 265 μm | 54 μm | 2400 μm | 8-10 mm |
| Nino SIM | 350 μm | 166 μm | 54 μm | 2400 μm | 8-10 mm |

The function of the air gap is to prevent oversaturation of the magnetic field in the core. The term "gap" means that it is a space where there is a material with a relative permeability approaching 1; it does not have to be a physically empty or—exactly—an air gap. The gap in form of a non-conductive layer can be produced as a plastic film below the core on the conductive strips.

The antenna can be placed, for example, on a PCB inside the mobile communication device, or it can be placed within the body of the removable memory card, or it can be placed on the SIM card, or it can be placed on a battery, or it can be placed within the combination of the abovementioned possibilities.

DESCRIPTION OF DRAWINGS

The invention is further disclosed by means of FIGS. 1 to 18. The used scale of depiction, the number of the threads, the ratio of sizes of individual elements—for example, the ratio of the thickness of the wire to the other dimensions of the antenna—does not have to correspond to the description in the examples and these sizes and ratios cannot be interpreted as limiting the scope of protection.

FIG. 9 is a comparison of the magnetic features of the antennas. Part "a" depicts the magnetic field of the antenna with the typical circumferential winding of the flat conductor; part B depicts the magnetic field of the antenna according to this invention where the antenna has connecting surfaces with the bonded flat wire on the sides of the core.

Description of FIG. 9a is following: h-field (f=15) [1] (peak); Cutplane Name: Cross Section A; Cutplane Normal: 0, 0, 1; Cutplane Position: 0; Component: Y; Orientation: Outside; 2D Maximum [Nm]: 2282; Frequency: 15; Phase: 0.

Description of FIG. 9b is following: h-field (f=15) [1] (peak); Type: H-Field (peak); Cutplane Name: Cross Section A; Cutplane Normal: 0, 0, 1; Cutplane Position: 0; Component: Y; Orientation: Outside; 2D Maximum [Nm]: 2282; 2D Max. Position: 4.109, −1.375, 0; Frequency: 15; Phase: 0.

FIGS. 13 and 14 depict two main possibilities of an arrangement of the required pitch of the thread of the conductive loop.

FIG. 14 the pitch of the thread is evenly produced by a slope of the conductive strip and the slope of the wire.

EXAMPLES OF REALIZATION OF THE INVENTION

Example 1

In this example according to FIGS. 1 to 4, 6, 9, 13 and 16 the antenna is produced as an independent component designed for subsequent mounting on the PCB. The antenna has a ferrite core 1 with flat rectangular cross-section. The core 1 is 9 mm long and its rectangular cross-section has dimensions 2.4 mm×0.3 mm.

Figure 1:
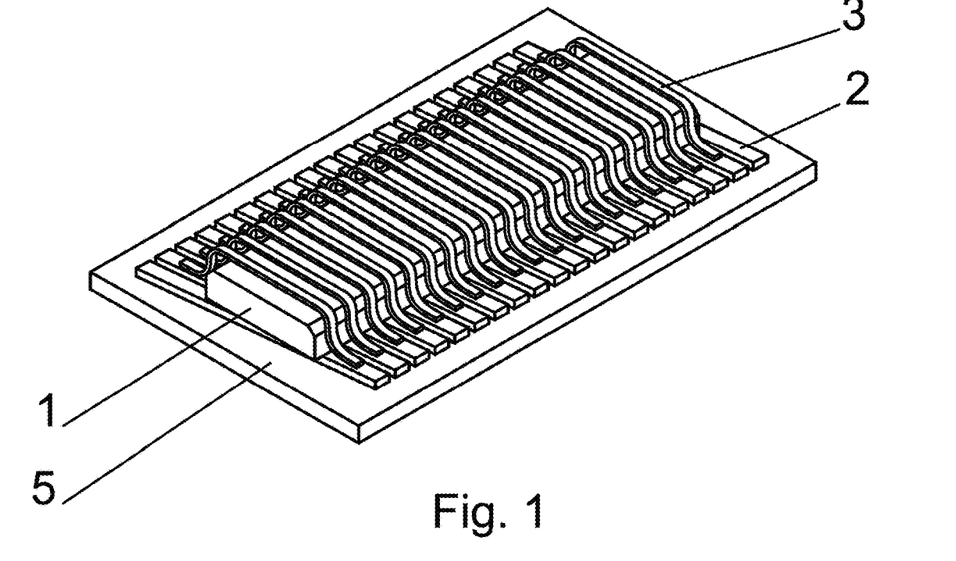
FIG. 1 is an axonometric view of the antenna with the flat cross-section of the wires.
Figure 2A:
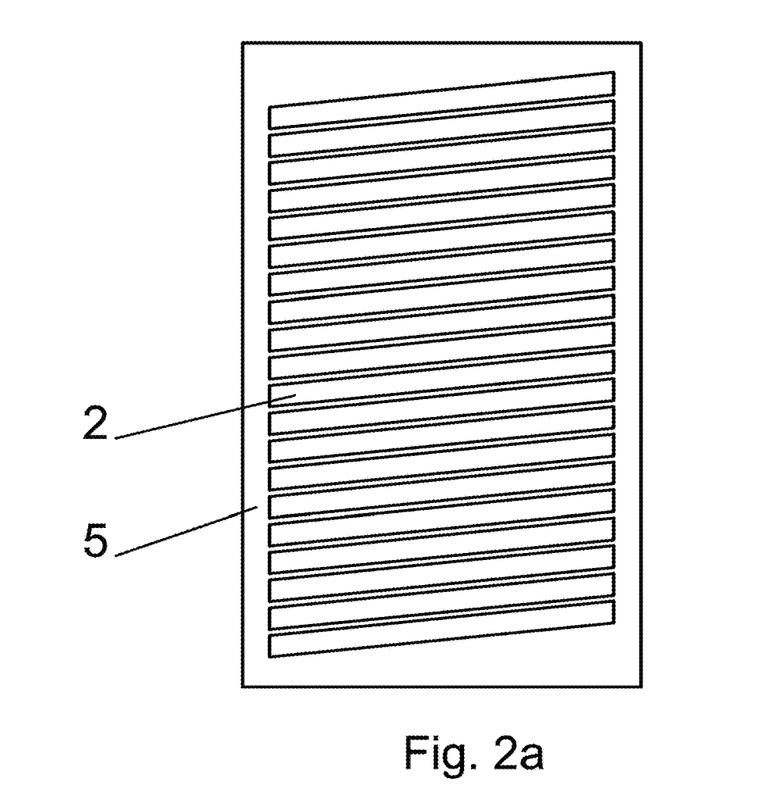
FIG. 2a is a ground plan view of the substrate with the conductive strips produced before the insertion (placement) of the core, and before the bonding of the wires.
Figure 2B:
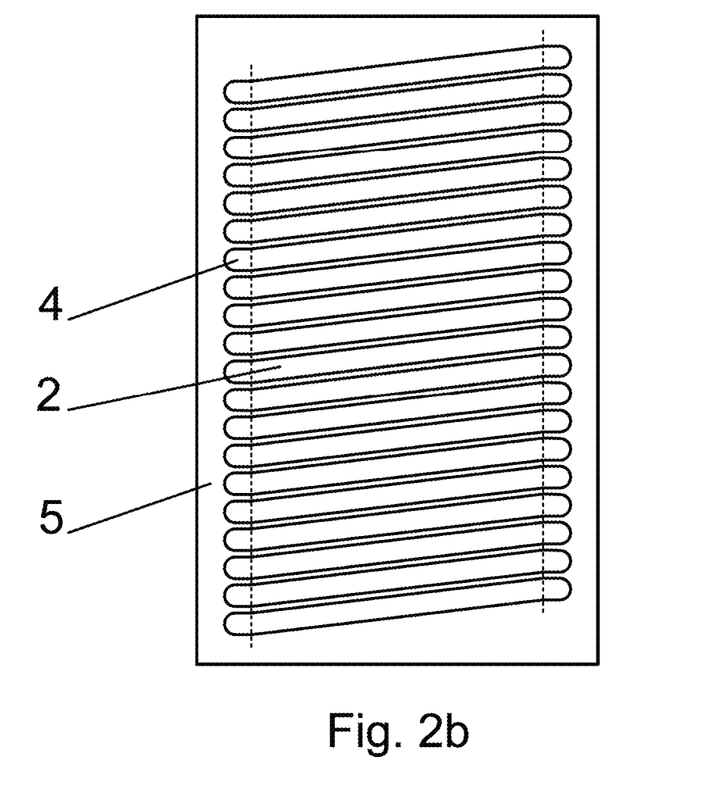
FIG. 2b is a view of the conductive strips with the connecting surfaces which are depicted by the dashed line alongside the edges of the core.

The substrate 5 is a non-conductive pad on which the layer with a group of conductive strips 2 is pressed. The conductive strips 2 in this example are parallel; the antenna has a constant angle of the pitch of all threads. Each conductive strip 2 is independent; it is not connected within the substrate 5 with the neighboring conductive strip 2.

The core 1 is placed on the substrate 5 in such a way that it is co-axial with the longitudinal axis of the flat element which is formed by a group of the conductive strips 2. The axis of the core 1 creates and angle of approximately 80° with the conductive strips 2.

Figure 3:
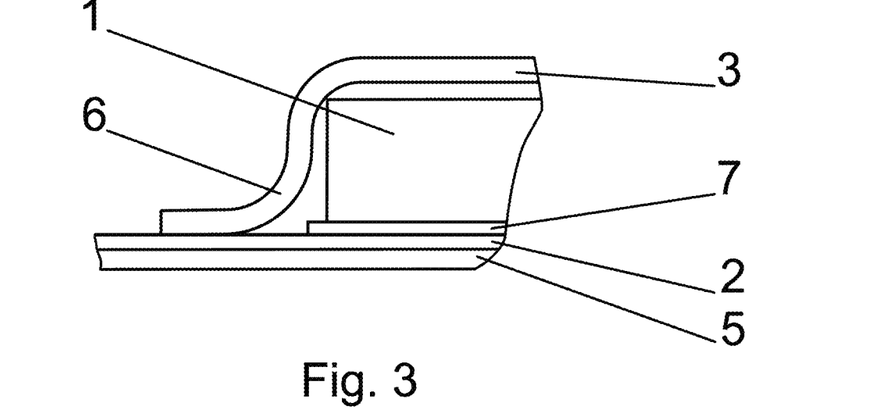
FIG. 3 is a detail of the connection of the wire to the connecting surface with the fold of the wire upwards alongside the lateral wall of the core.
Figure 4:
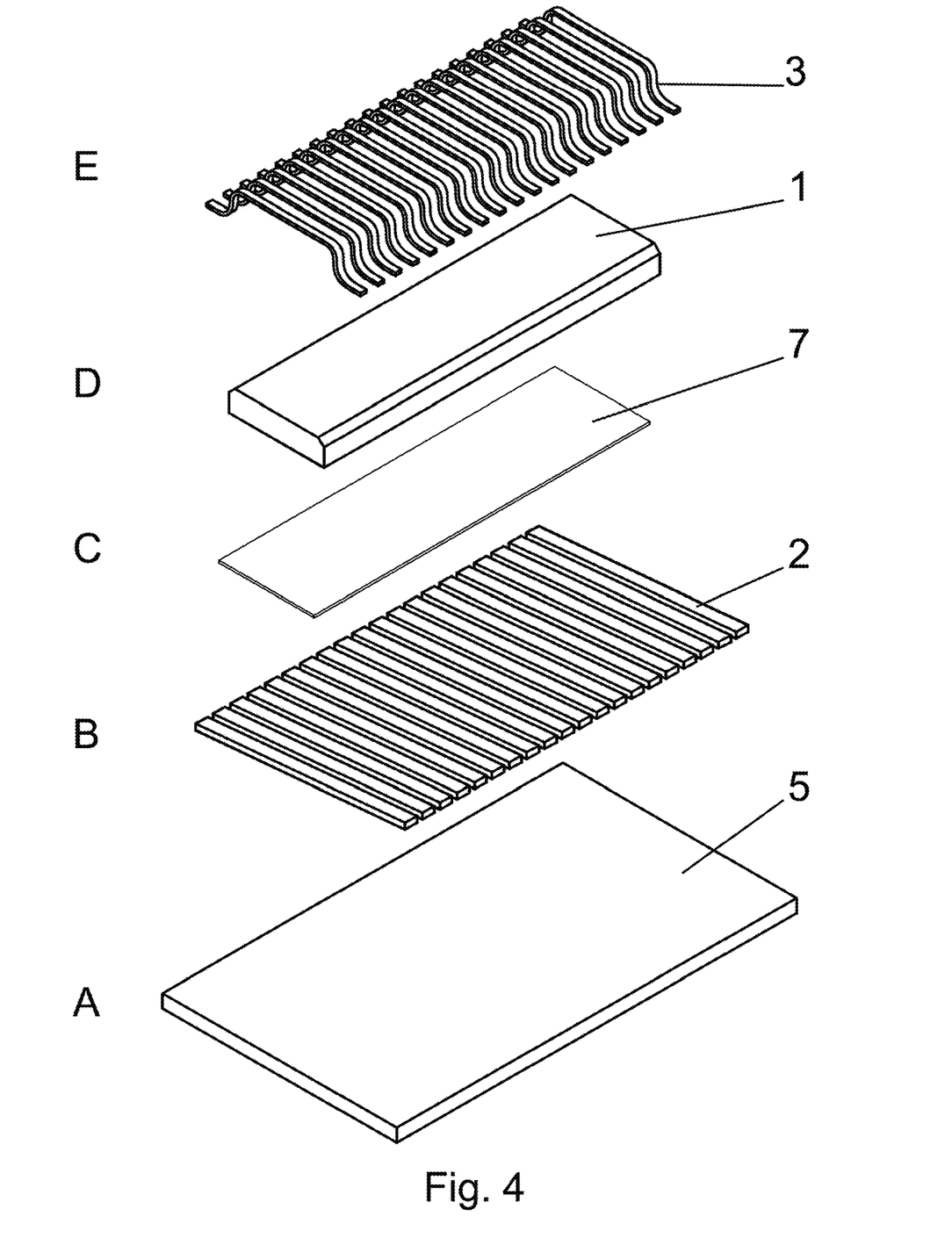
FIG. 4 depicts a method of production of the antenna with steps A to E, where the core is placed on the substrate before bonding.

After the placement of the core 1 on the substrate 5 the end of the wire 3 is welded to the connecting surface 4 on the end of the first conductive strip 2. At the same time this end of the wire 3 is adjacent to the connecting surface 4; it is therefore basically parallel with the plane of the substrate 5. The bonding needle shapes the arc 6 on the flat wire 3 by upward pull and movement towards the core 1; then the wire 3 runs upwards alongside the lateral wall of the core 1; then the wire 3 runs above the upper surface of the core 1 and then it again descends alongside the lateral wall of the core 1 towards the connecting surface 4 on the opposite end of the neighboring conductive strip 2. Here the wire 3 is again led by an arc 6 to the connecting surface 4 to which it is being bonded (welded) and then the wire 3 is cut from the wire pulled from the roll in the bonding machine. This process created a single loop of the thread of the antenna; the lower part of the conductive path is formed by the conductive strip 2; the upper part of the conductive path is form by the wire 3 shaped as upside-down "U".

The wire 3 holds the core 1 in the desired position and no further anchoring or gluing of the core 1 to the substrate 5 is necessary. The antenna in this example forms an independent component which is mounted on the PCB of the host device.

The wire 3 creates a 90° angle with the longitudinal axis of the core 1, which is basically an even 5° slope from the normal as do conductive strips 2 have, but with opposite orientation.

The NiZn material of the core 1 has following features, which can vary in ±15% margin:

| Symbol | Condition | Value | Unit |
| --- | --- | --- | --- |
| $\mu_i$ | 25° C.; <10 kHz 0.25 mT | ~80 | |
| $\mu_a$ | 100° C.; <25 kHz 200 mT | ~300 | |
| $\mu_s'$ | 100° C.; <15 MHz 200 mT | ~80 | |
| $\mu_s''$ | 100° C.; <15 MHz 200 mT | ~5 | |
| B | 25° C.; <10 kHz 3000 A/m | ~320 | mT |
| | 100° C.; <10 kHz 3000 A/m | ~320 | mT |
| Pv | 100° C.; <3 MHz 100 mT | <200 | kWS/m$^3$ |
| | 100° C.; <10 MHz 5 mT | <200 | |
| tan$\delta/\mu_i$ | 100° C.; <15 MHz 200 A/m | 7, 8.10$^{-4}$ | |

Figure 9:
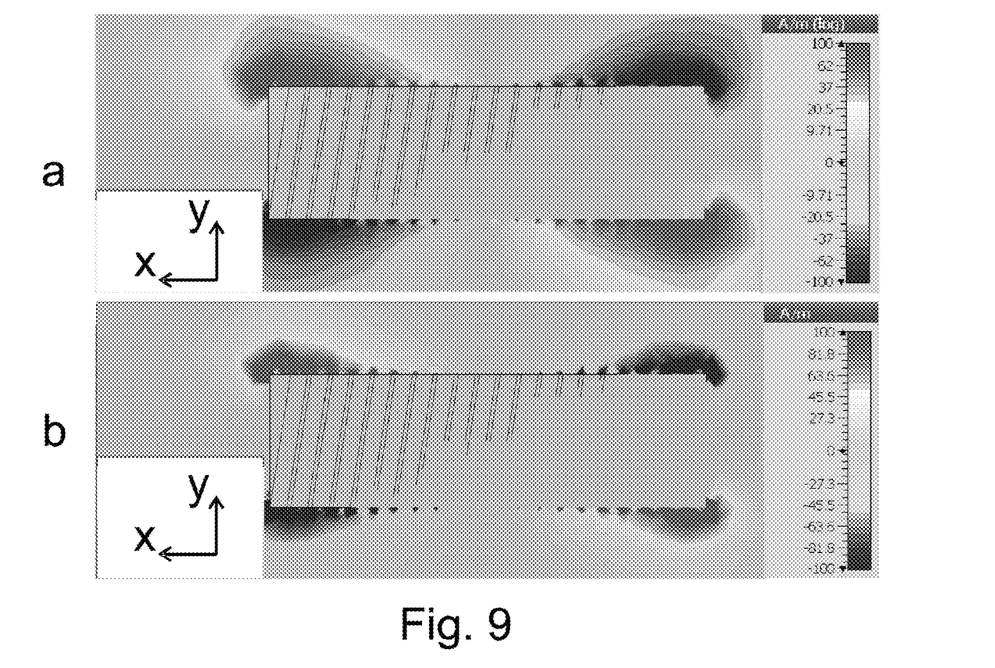
Figure 16:
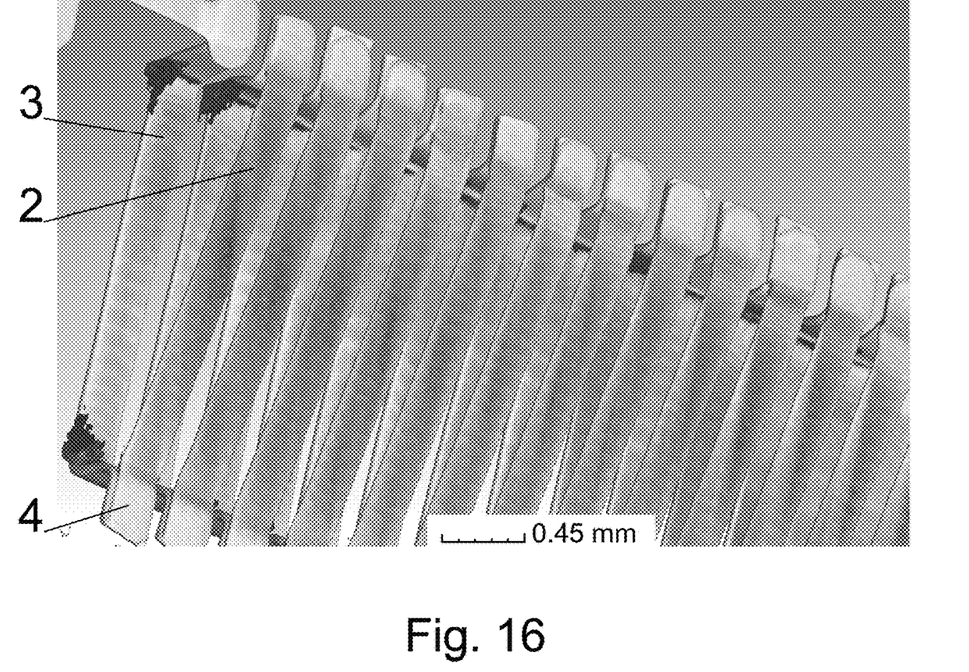
FIG. 16 is a tomographic bottom view of the antenna with the bonded flat wires on the prototypical antenna. The irregularities in the geometry of the threads are caused by the different deformations during the non-automatized method of bonding.

As the results of comparison according to FIG. 9 show, the connecting surfaces 4 have positive influence upon the magnetic features of the antenna according to this invention. The tomographic view of the FIG. 16 depicts an antenna produced by a prototype method.

Example 2

In this example according to FIGS. 1 to 3, 5, 7 and 9 the antenna is produced directly on the PCB of the microSD card. The conductive strips 2 are produced on the PCB. Bonding is used during the mounting of the chips on the PCB; this bonding at the same time produced a connection of the opposite ends of the conductive strips 2 in the same way as in example 1. After gradual creation of all bonding connections of the wires 3, the core 1 is inserted into the created channel between the wires 3 and the conductive strips 2.

Figure 5:
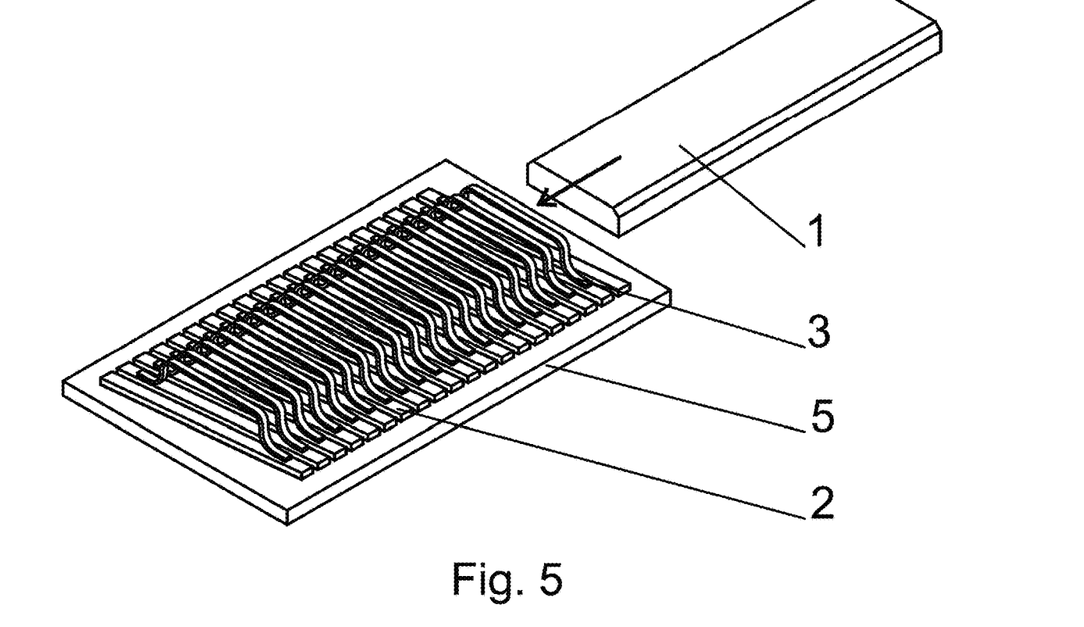
FIG. 5 depicts the method of production of the antenna where the core is inserted into the channel which is produced between the folded wires and the substrate with the conductive strips.
Figure 6:
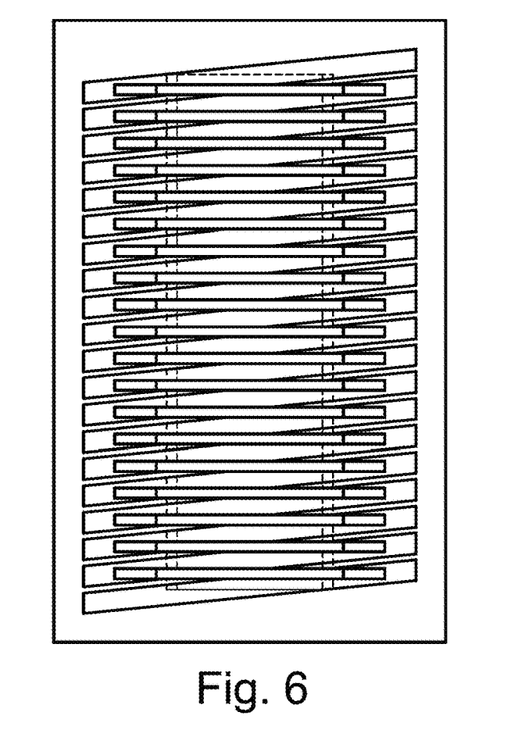
FIG. 6 is a ground plan view of the antenna where—for the purposes of transparency—the core is depicted by a dotted line, whereby the pitch of the thread is ensure by the slope of the conductive strips; the flat wires are led perpendicularly on the longitudinal axis of the core.
Figure 7:
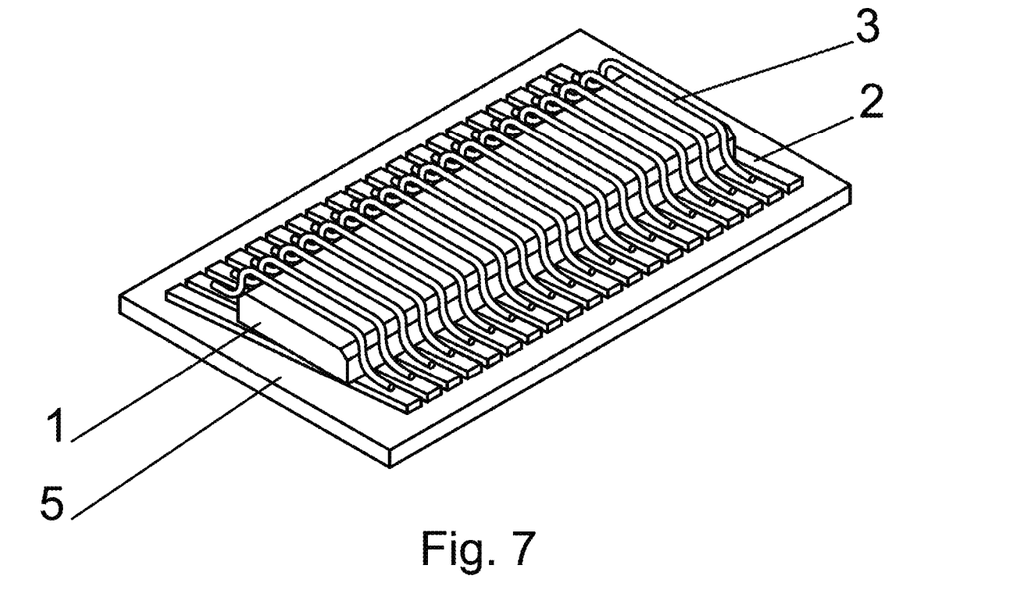
FIG. 7 is an axonometric view of the antenna with the circular cross-section of the wires; whereby each thread is closed by a single wire.

The conductive strips 2 in the example are 0.256 mm wide and from both sides of the core they overhang in length of 0.44 mm. The core 1 has groundplan dimensions 8.9×2.3 mm. The thickness of the core 1 is 0.291 mm.

Example 3

Figure 8:
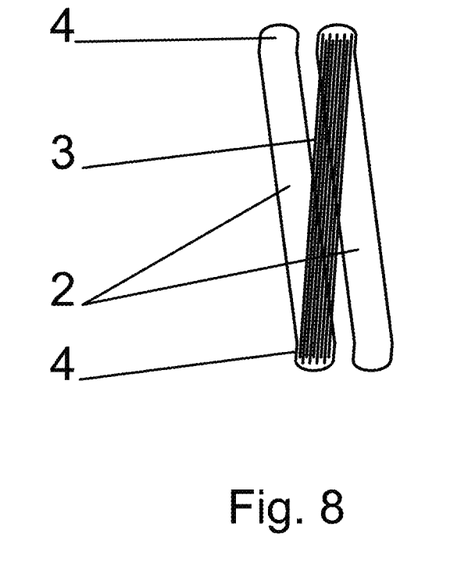
FIG. 8 depicts the solution with multiple wires of the circular cross-section within a single thread. Two opposing connecting elements of a single thread are connected by multiple wires, whereby the pitch of the thread is divided between the slope of the conductive strip and slope of the wires.

In this example of realization according to FIG. 8 nine wires 3 are used for a connection of a single thread; the wires 3 have circular cross-section and connect the opposing connecting surfaces 4 of two neighboring conductive strips 2. Individual bonds (connecting points) are distributed chequerwise on a connecting surface 4; that is, they are distributed in such a way that the wires 3 can lead above the core 1 tightly close to each other, and at the same time that a small surface suffices for connection.

Example 4

Figure 10:
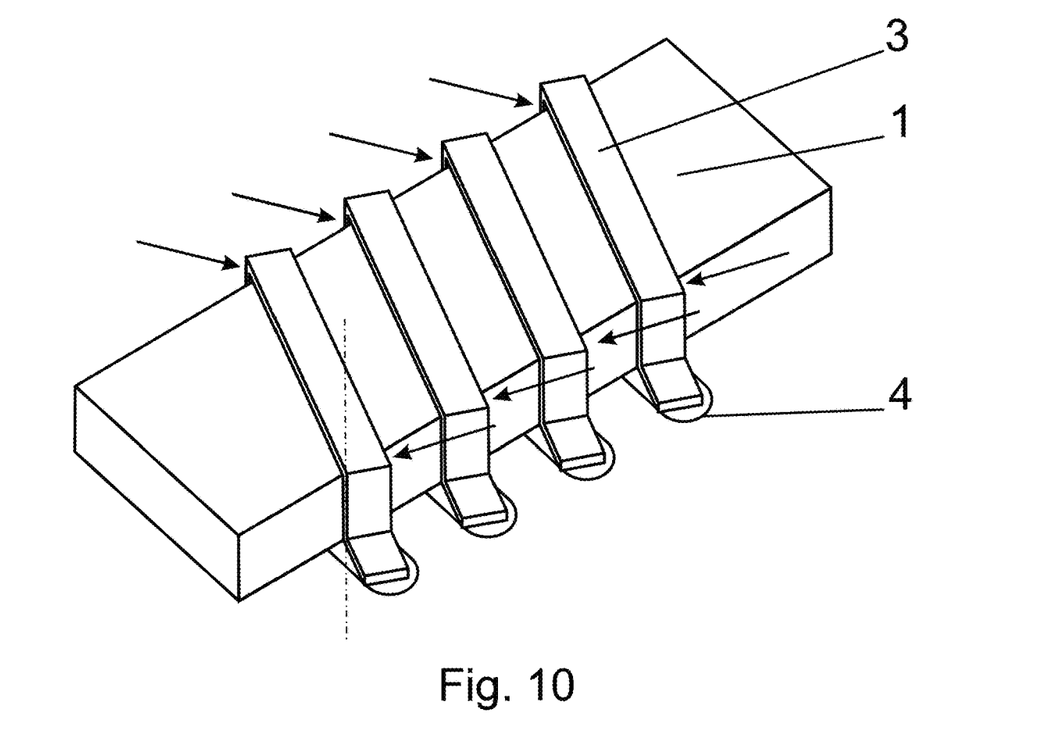
FIG. 10 is a detail of the fold of the flat wire which is led askew and which is bent by a common bonding technology.

During the welding and shaping of the wire 3 according to the FIG. 10 an existing technology of bonding is used. The fold of the flat wire 3 is always led perpendicularly on the plane of the substrate 5. This leads according to the FIG. 10 to the creation of the gaps, sags (overhangs) in one corner of the folded wire 3. These sags are on the FIG. 10 depicted by the arrows. The wire 3 is by the lateral wall of the core 1 led perpendicularly.

Example 5

Figure 11:
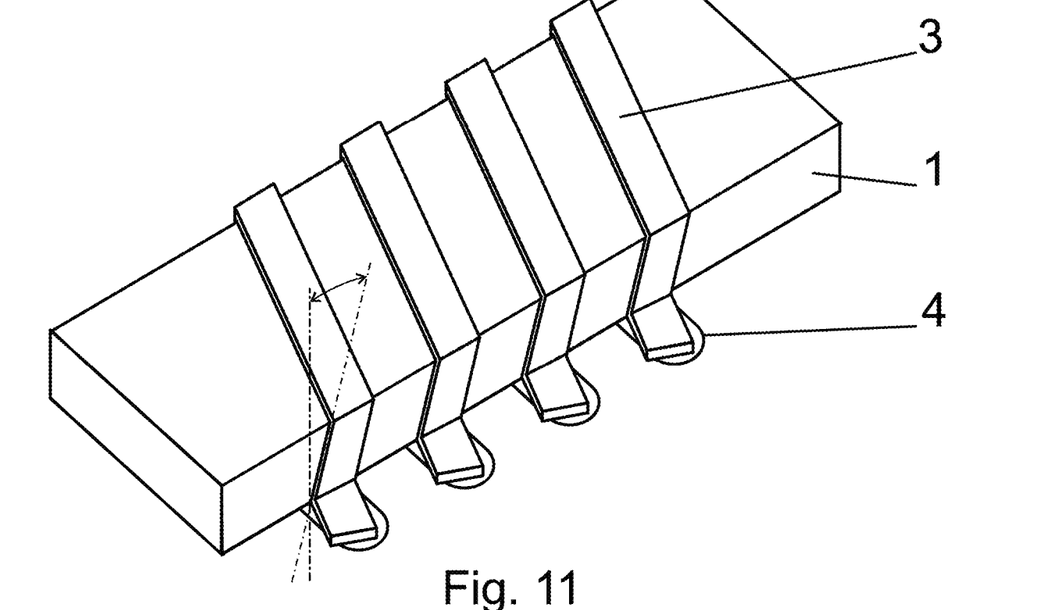
FIG. 11 then depicts a flat wire with the fold led askew. The dot-dashed line depicts the slope of the wire on the lateral wall of the core; on FIG. 10 the wire runs perpendicularly downwards; on FIG. 11 the wire on the lateral wall of the core is led askew downwards. For the sake of transparency, larger pitch and low number of the threads is depicted on the FIGS. 10 and 11.

During the welding and shaping of the wire 3 according to the FIG. 11 a modified technology of the bonding is used, which allows bending of the flat wire 3 slantwise. The fold of the flat wire 3 is pulled in such a way that it corresponds to the edge of the core 1, which leads to the fact that the wire 3 is on the lateral wall of the core led askew, deviating from the perpendicular line (normal) to the plane of the substrate 5.

Example 6

Figure 12:
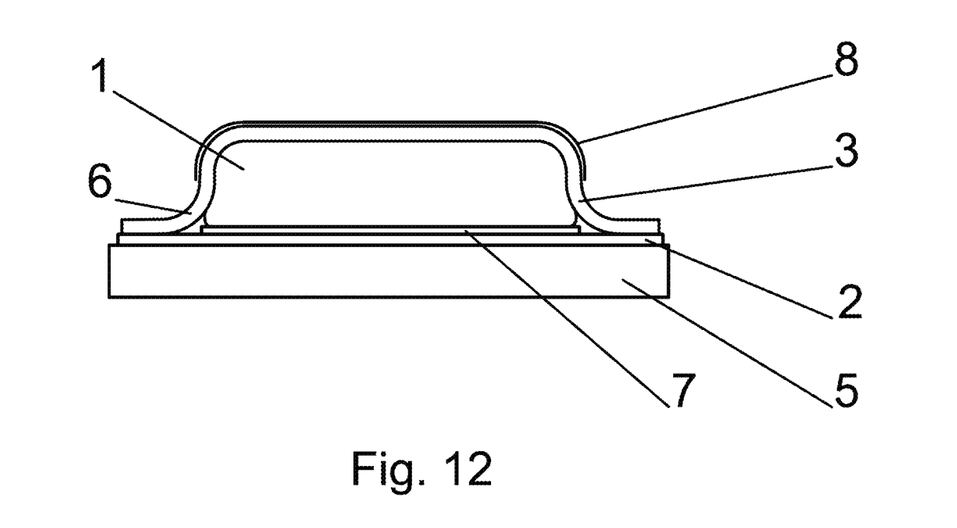
FIG. 12 depicts the use of the foil which on its lower side temporarily keeps the wires during bonding by a multifold bonding head. The core is produced from a paste which is pressed into the cavity between the wires and conductive strips, where it subsequently ossifies.

After the creation of the group of the conductive strips 2 the layer of plastic is applied onto them in such a way that the conductive surfaces 4 remain exposed on the conductive strips 2. This layer of plastic forms a gap 7. The wires in this example of realization according to FIG. 12 are glued to the temporary transferring foil 8 which maintains the pitch of the whole group of the wires 3. The wires 3 are bonded to the connecting surfaces 4 on the one side of the core 1 by means of the multifold bonding head which welds all the wires 3 in a single step. Then the movement of the bonding head folds a group of the wires 3 into the shape for the encirclement of the core 1. Now the multifold bonding head welds all the wires 3 in a single step on the other side of the core 1.

The core 1 is inserted to the cavity between the wires 3 and the conductive strips 2 by means of the ferrite gel or paste, which is pushed into the cavity by the nozzle, fills the cavity in, and ossifies.

Example 7

Figure 13:
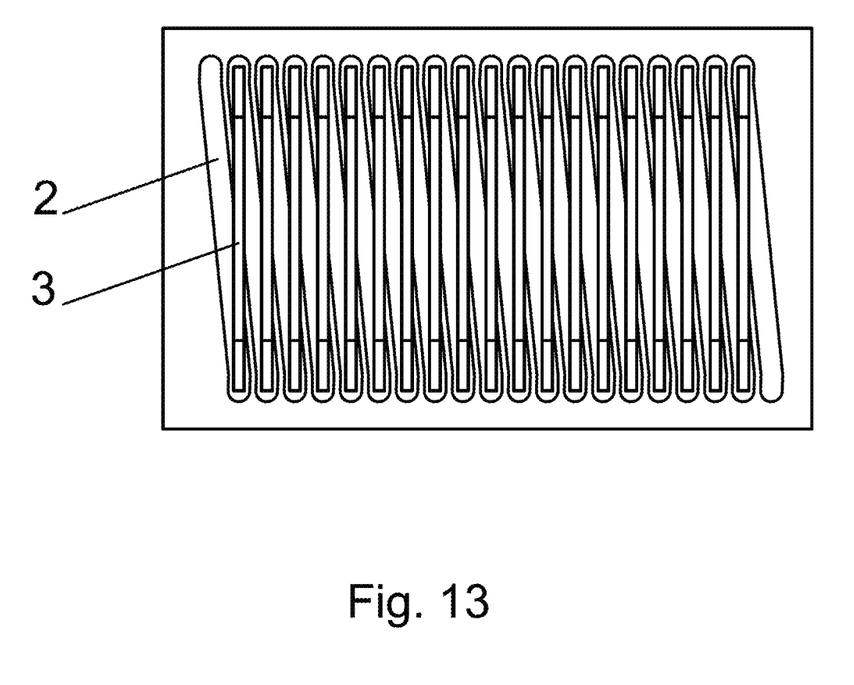
FIG. 13 is an arrangement where the pitch of the thread is ensured only by the slope of the conductive strip.

FIG. 13 presents an example of realization where the pitch of the thread of the antenna is created only by the slope of the conductive strips which are applied onto the substrate 5 in such a way that the flowline between the connecting surfaces 4 of the neighboring conductive strips 2 is perpendicular on the longitudinal axis of the core 1. In such arrangement the wires 3 are not led slantwise; they are perpendicular on the longitudinal axis of the core 1.

Example 8

Figure 14:
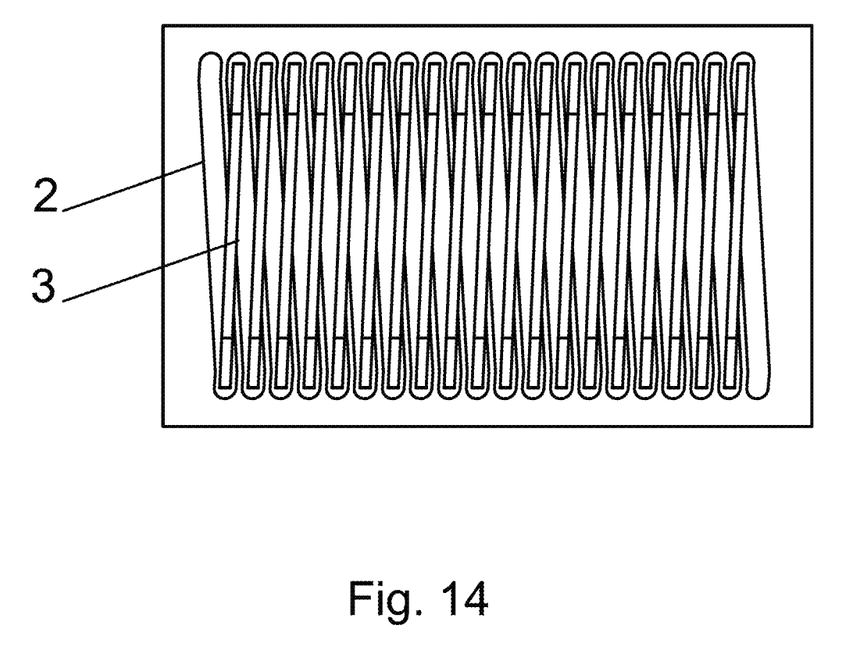

In the realization of the antenna according to FIG. 14 the pitch of the thread of the antenna is formed by the slope of the conductive strips 2 and the slope of the wires 3. The conductive strips 2 are on the substrate 5 sloped in 4° from the perpendicular line (normal) on the longitudinal axis of the core 1. The wires 3 create an angle of 86° with the longitudinal axis of the core 1, which is the same 4° deviation from the normal as in the case of the conductive strips 2, but with the different orientation.

Example 9

Figure 15:
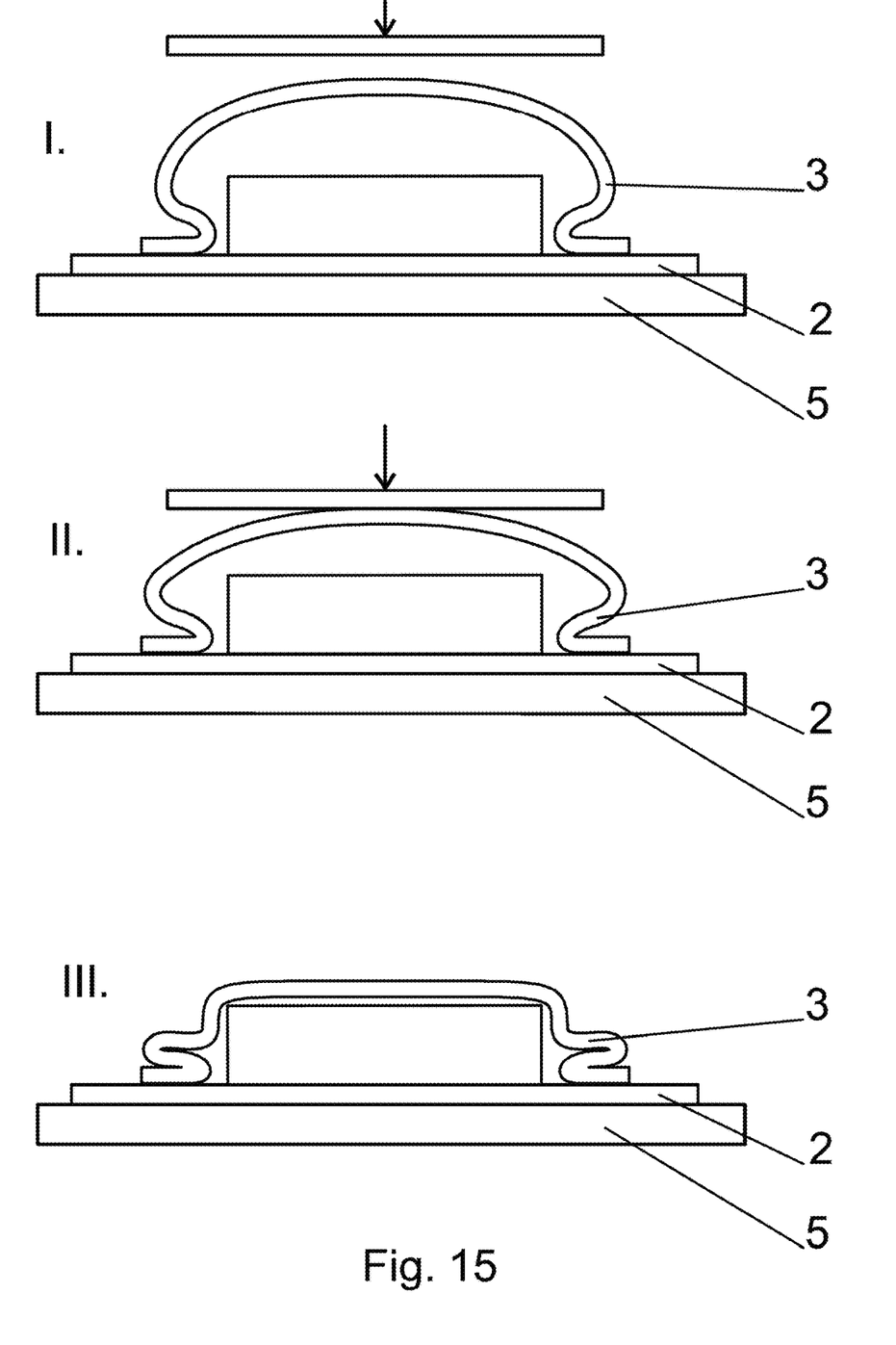
FIG. 15 depicts the subsequent forming of the wires in steps A to C by means of the pressing machine, where the ends of the wires are bonded with the production of the S-shaped folds. For the sake of transparency, the thickness of the wire is increased.

Conductive strips 2 with the connecting elements 4 are produced on the substrate 5. The core 1 is placed on the conductive strips 2. The wire 3 is bonded in such a way that in the zone of connection it creates a deformation in the shape of the letter "S" and the wire 3 is led with the gap alongside the body of the core 1. This prevents the interferences of the bonding head with the body of the core 1. On the opposite side the wire 3 in the zone of connection is shaped into the letter "S". Both these shapings of the wire 3 in the zone of connection are at this moment open and the wire 3 has a gap above the core 1. Subsequently, a pressure from above on the wires 3 is produced by means of a forming tool, and the wires 3 deform in such a way that they lean onto the upper surface of the core 1 and the wires 3 are stacked on each other in the zone of connection. In the final phase the wires 3 in the realization according to this example are placed on the connecting surface 4 in three layers.

Example 10

Figure 17:
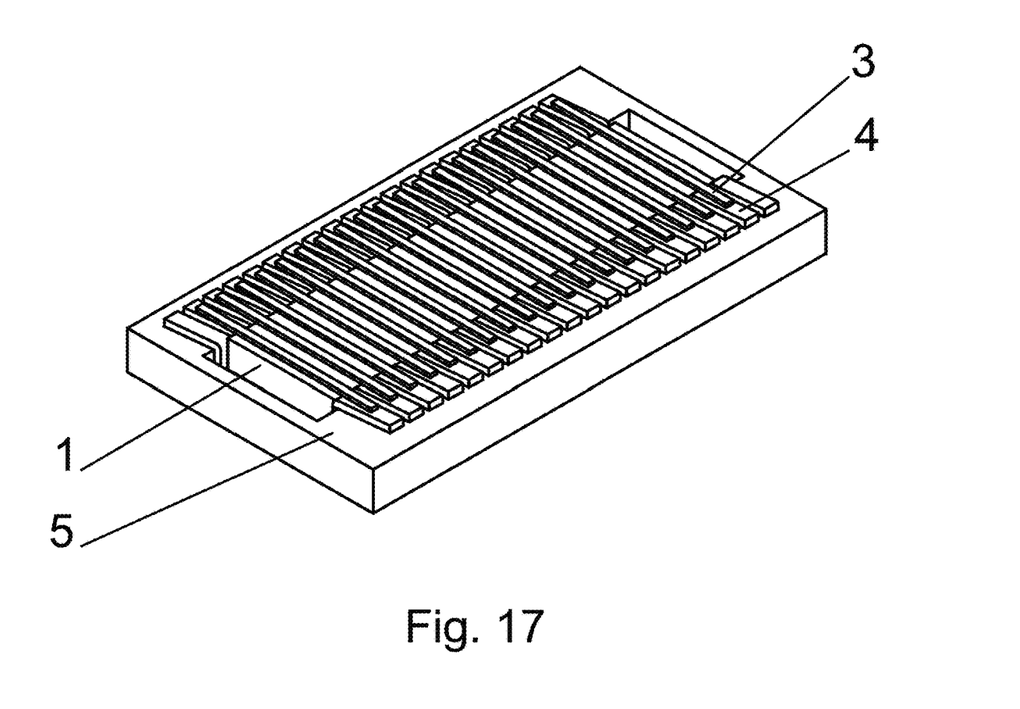
FIG. 17 depicts an antenna with the core embedded in the groove in the substrate.
Figure 18:
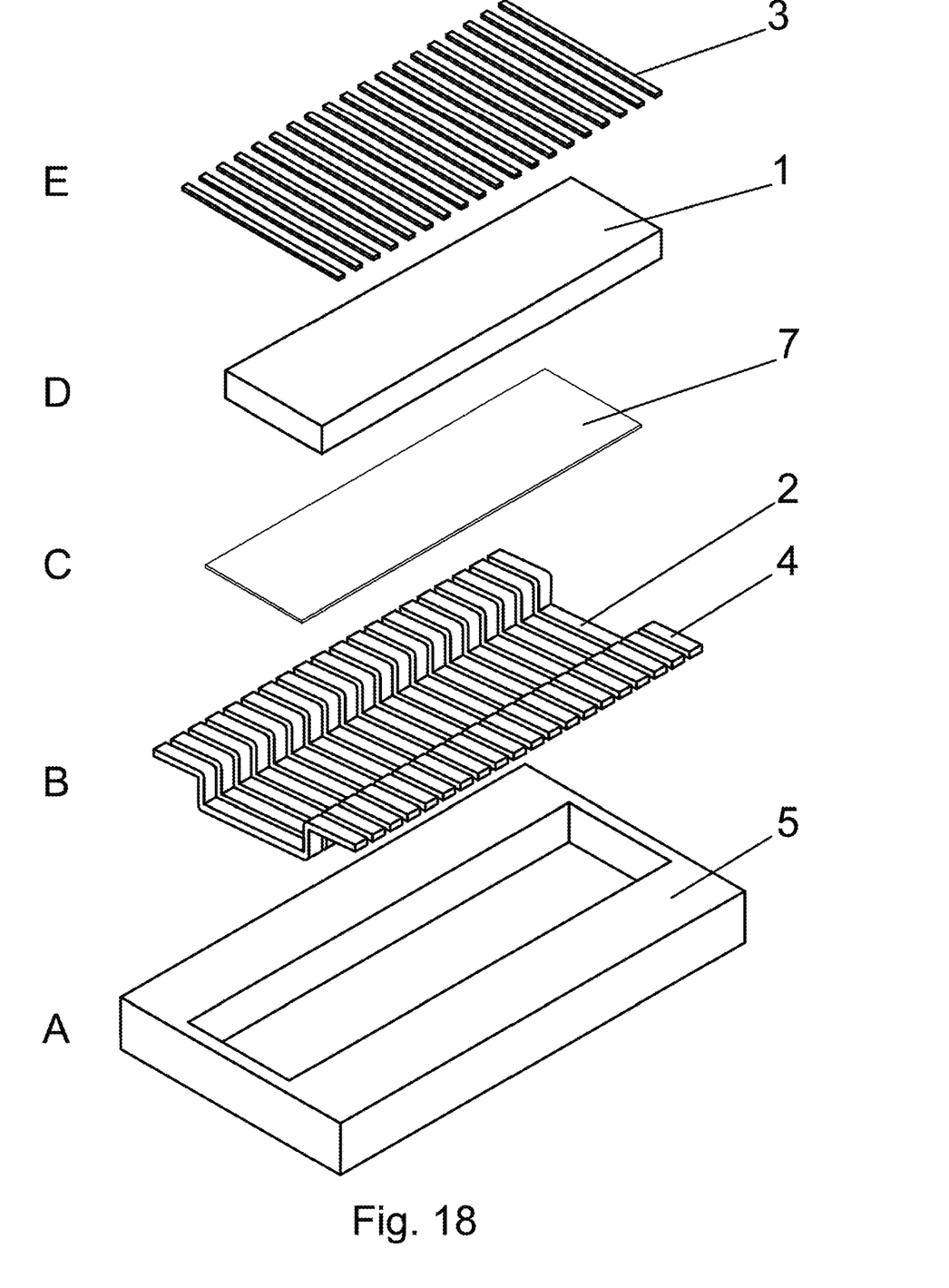
FIG. 18 depicts steps A to D during a production of the embedded antenna.

According to FIGS. 17 and 18 a groove for the embedding of the core 1 is produced in the substrate 5. The conductive strips 2 are applied onto the surface of the substrate 5 in such a way that they are placed at the bottom of the groove and also on the lateral walls of the groove, then they run upwards from the groove and on the upper surface of the substrate 5 the conductive strips 2 are ended by the connecting surfaces.

Subsequently a layer of the plastic is applied to the bottom; this will form a gap 7. The core 1 is inserted into the groove. Now the upper edge of the core is at the level of the upper surface of the substrate 5. The wires are bonded in such a way that it is not necessary to bend them, since the encirclement of the body of the core 1 is ensured by the spatial shape of the conductive strips 2.

INDUSTRIAL APPLICABILITY

Industrial applicability is obvious. According to this invention it is possible to industrially and repeatedly produced and use the antenna with the core, mainly a miniature RFID and/or NFC antenna with high emitting capability, high mechanical resilience and miniature dimensions.

LIST OF RELATED SYMBOLS AND ACRONYMS

1—core
2—conductive strip
3—wire
4—connecting surface
5—substrate
6—arc
7—gap
8—foil
PCB—printed circuit board
NFC—near field communication
RFID—Radio-frequency identification
SD—Secure Digital
SIM—Subscriber Identity Module

The invention claimed is:

1. An antenna with a core where conductive loops encircle an oblong core (1) placed on a non-conductive substrate (5), and where part of the conductive loop is formed by a printed circuit on the substrate (5), the antenna comprising:
   a group of conductive strips (2) placed side by side on the substrate;
   the core (1) is placed on the conductive strips (2);
   the conductive strips (2) overhang from a ground plane of the core (1) in such a way that ends of the conductive strips (2) overhanging on both sides of the core (1) form connecting surfaces (4);
   wires (3) shaped for an encirclement of the core are connected to the connecting surfaces (4);
   wherein the wire (3) connects the connecting surface (4) of one conductive strip (2) to the connecting surface (4) on the opposite end of the neighboring conductive strip (2);
   the wire (3) has a width forming 50% to 100% of the width of the conductive strip (2) and the wire (3) has a flat or an oval cross-section;
   wherein the antenna is a miniature RFID antenna or a NFC antenna.

2. The antenna according to the claim 1, wherein the conductive strips (2) are parallel to each other.

3. The antenna according to claim 1, wherein the wire (3) is bonded to the connecting surface (4) by a wedge bonding.

4. The antenna according to claim 1, wherein the wire (3) has a width which is more than twice its thickness.

5. The antenna according to claim 1, wherein the connecting surface (4) of one conductive strip (2) is connected with the opposite connecting surface (4) of the neighboring conductive strip (2) by at least two wires (3) led in parallel.

6. The antenna according to claim 1, wherein the substrate (5) is formed by an independent pad whose ground plane dimensions correspond to the group of the conductive strips (2), or the substrate (5) is formed by a PCB with other components.

7. The antenna according to claim 1, wherein the core (1) in the cross-section has a height up to 0.5 mm and a width in a cross-section ranging from 2 to 2.5 mm.

8. The antenna according to claim 1, wherein the conductive strips (2) are sloped from the ground plane normal of the core (1) under an angle corresponding to a pitch of threads and the wires (3) are led in the opposite slope with the same size of the angle.

9. The antenna according to claim 1, wherein the conductive strips (2) overhang on each lateral side of the core (1) in a length which is at least 5% of a transversal dimension of the core (1); at minimum they overhang in the length at least 0.25 mm.

10. The antenna according to claim 1, wherein:
the end of the wire (3) in a place of joint with the connecting surface (4) runs in parallel with a plane of the substrate (5) and it is oriented in a direction out from the core (1); or
the wire (3) in the place of joint with the connecting surface (4) is "S" shaped, whereby three layers of the wire (3) are placed above each other in the place of joint.

11. The antenna according to claim 1, wherein the core (1) is at least partially embedded in a groove in the substrate (5); the conductive strips (2) run from a bottom of the groove up on lateral walls of the groove and they are ended by the connecting surfaces (4) on a upper surface of the substrate (5).

12. The antenna according to claim 1, wherein the antenna is placed on or in the substrate (5) of a removable memory card with a contact interface.

13. The antenna according to claim 12, wherein the removable memory card is microSD card or SIM card or mini-SIM card or nano-SIM card.

14. The antenna according to claim 1, wherein the wires (3) are glued on a foil (8).

15. The antenna according to claim 1, wherein between the wires (3) and the core (1) and/or between the core (1) and the conductive strips (2) there is a gap (7).

16. A method of a production of the antenna with a core comprising the steps of:
placing side by side a group of independent conductive strips (2) on a non-conductive substrate wherein a number of the conductive strips (2) corresponds to a number of conductive loops of the antenna;
welding on an end of the wire (3) by the bonding on one end of the conductive strip (2) and a second end of the wire (3) is welded to the opposite end of the neighboring conductive strip (2),
placing the core (1) on the non-conductive substrate (5) before bonding the wires (3) or placing the core (1) on the non-conductive substrate (5) after the bonding of the wires (3);
repeating subsequently the bonding of the wires (3) for all conductive loops of the antenna which connects all conductive strips (2) behind each other
wherein after the bonding to one end of the conductive strip (2) the wire (3) is shaped above the substrate (5) by a bending in such a way that it arches over a space intended for the core (1) and all the wires (3) are shaped in such a way that they produce a channel for the core (1) placed on the substrate (5), whereby the flat or oval wire (3) is bonded;
wherein the core (1) is inserted from a side to the channel between the shaped wires (3) and the non-conductive substrate (5); and
wherein the antenna is a miniature RFID antenna or a NFC antenna.

17. The method according to claim 16 wherein the bonding of the wires (3) takes place in a phase when other components are bonded on the PCB of the host device.

18. The method according to claim 16, wherein multiple wires (3) are bonded from the single connecting surface (4), the wires (3) then connect the connecting surface (4) of the single conductive strip (2) with the connective surface (4) of the neighboring conductive strip (2).

19. The method according to claim 16 wherein the wire (3) is bonded by wedge bonding.

20. The method according to claim 19, wherein all wires (3) on one side of the core (1) are bonded in the first step and all wires (3) on the other side of the core (1) are bonded in the second step.

* * * * *